March 26, 1940. H. A. MYERS 2,195,372
LIFTING JACK
Filed July 24, 1939
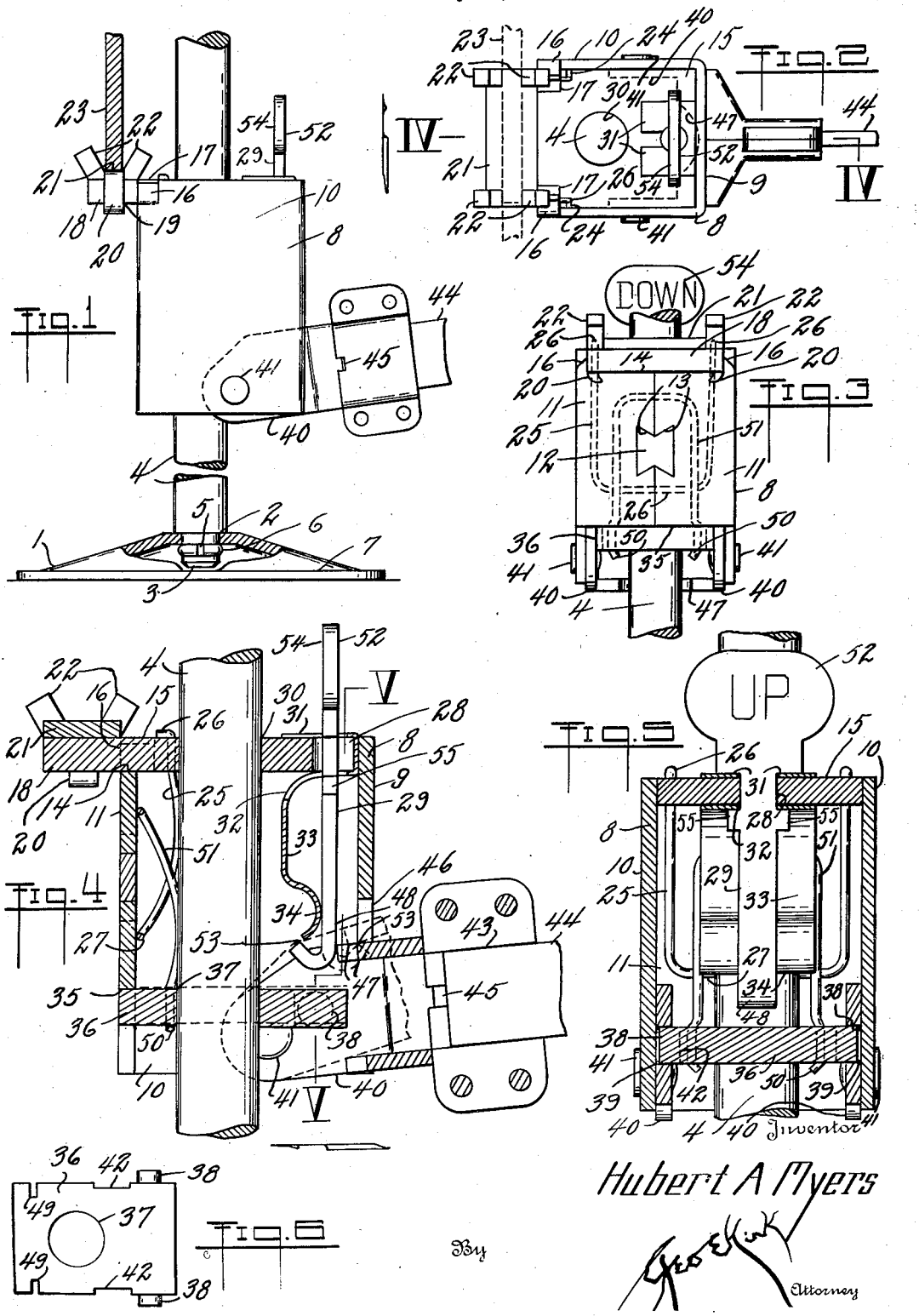
Inventor
Hubert A Myers
By
[signature]
Attorney Patented Mar. 26, 1940

2,195,372

UNITED STATES PATENT OFFICE 2,195,372

LIFTING JACK

Hubert A. Myers, Toledo, Ohio, assignor of one-half to Henry W. McKisson, Toledo, Ohio Application July 24, 1939, Serial No. 286,087

10 Claims. (Cl. 254—106)

This invention relates to projecting or lifting apparatus.

This invention has utility when incorporated in jacks, more especially as of wrought metal structure throughout for producing light weight, rigid construction, reliably adaptable to motor vehicle uses.

Referring to the drawing:

Fig. 1 is a side elevation, with parts broken away, of an embodiment of the invention in a lifting jack, say as disposed for positioning under the bumper of a motor vehicle;

Fig. 2 is a plan view of the device of Fig. 1 in which the base for the stem is omitted;

Fig. 3 is a view of the device from the left of Fig. 1;

Fig. 4 is a section on the line IV—IV, Fig. 2, showing the parts in grip or upwardly projecting position of travel for the housing as to the stem;

Fig. 5 is a view on the line V—V, Fig 4; and

Fig. 6 is a plan view of the lower or propulsion plate.

Base 1 is shown as having opening 2 therein, into which may be thrust reduced portion 3 of upright stem 4. This reduced portion 3 has groove 5 therein which may be engaged by split spring ring 6 to serve as a lock for holding the stem 4 assembled with this press-formed sheet metal base 1 having flat marginal rim 7.

Upon this stem or shaft 4 as a support, the movable carrier of the invention is mounted and travels along such stem as a guide. This carrier comprises rectangular sheet metal tube or box 8, comprising front portion 9, parallel sides 10, and pair of back sections 11. These half back sections 11 (Fig. 3), one from each side 10, have their ends abut and thereby engaged by double-ended dove tail rivet wedge 12 as entering recesses 13 in the respective sides 11. The box 8 is thus rigidly assembled. These rear portions 11 at their upper terminus have seat 14 downwardly offset from the top of the sides 10. In this seat or notch is located top plate 15 engaged by ears 16 from the sides 10 entering recess portions 17 in this plate 15. This plate 15 has projecting overhang 18 with end recesses 19 into which extend tongues 20 from cross-over piece 21. This cross-over piece 21 oppositely from its tongues 20 has upstanding spread fingers 22, thereby providing therebetween seat for bumper 23, or ready engaging means against slippage in the event the jack may be inserted under an axle or other part to be lifted or projected in the functioning of this tool.

Adjacent the lugs 16, recesses 24 in the plate 15 provide guides for spring 25 having termini 26 extending through said guides 24 and offset to engage the upper side of the plate 15. This spring 25 has lower bow portion 27 against the inner faces of the sides 11, 11, of the box 8. Remote from this anchorage of the plate 15 with the box 8, the plate 15 has notch or slot 28 in which may be located direction control key 29. Centrally of this box 8 the shaft or stem 4 extends through opening 30 in this plate 15. The stem 4 is thus between the seat portions 22 for engaging the bumper and the seat 28 for engaging the control key 29. This control key 29 is held in engagement with the plate 15 by flat spring having prongs 31 above the plate 15 and slot 32 below the plate 15. Spring portion 33 extends therebeyond to the terminal bow 34 urging the lower portion of the key 29 away from the stem 4.

Remote from the seat 14, the box 8 has seat 35 against which may be located lower plate 36 having guide opening 37 for the stem 4. Trunnions 38 on this plate 36 engage openings 39 in parallel forks 40. These parallel forks 40 extend past the trunnions 38 toward the shaft 4 there to have rivets 41 anchor the forks 40 with the respective sides 10 of the box 8. Clearance portions 42 in the plate 36 are sufficient for shifting of the plate 36 and avoiding abutting action as to the rivets 41. These forks or links 40 extend to provide guideway 43 into which may be thrust lever 44 against stop tongue 45 integral with the cheeks 40. These cheeks 40 operate in clearway 46 formed in the side 9 of the box 8 and have ledge portion 47 between the forks 40 in thrusting through this clearway 46 upon oscillation of the lever 44 to strike lower portion 48 of the key 29 and urge such portion of the key against the spring portion 34. The plate 36 has guides 49 for spring portions extending therethrough having key termini 50 with oppositely extending bow portion 51 against the inner sides of the portions 11 of the box 8. This spring 51 accordingly thrusts the plate 36 away from the sides 11 of the box, and thus oscillation of the lever 44 tends to have the plate 36 free of the stem 4 in the uplift movement of the lever 44, but binding with the stem 4 in the downward movement of the lever 44. There is thus effected a progress of the box 8 upwardly along the stem 4 for lifting action at the seat 22. The spring 25, as acting on the box side 11, tends normally to swing the plate 15 outward or upward from the box; while the spring 51 acts on the plate 36, tending normally to swing such outward or downward from the box, thereby developing opposite direction of pinch action on the stem 4 for the plate 36, as to the plate 15.

The key 29 has upper terminus side 52 away from the stem 4 as key 29 lower terminus hook 53 is toward the stem 4. This key side 52 bearing notation "up" thereby means that the functioning of this lever 44 as not disturbed by the key 29 is for lifting operation.

However, the operator may cause the key to be rotated to reverse the sides so that instead of side 52 being exposed to the operator as using the lever 44, the opposite side 54 is thus exposed with the notation "down". This means that at the lift position of the lever 44, the hook 53 as engaged under the cross-over portion 47 thus forms a catch to hold the plate 36 in the non-binding or release position as to the stem 4. The cooperating plate 16 is likewise in the less binding relation due to the position of the pair of plates in the box 8 and the unit may be readily allowed to shift down along the stem 4 and thereby unload itself. The key 29 may not be pulled upward out of the box 8 for releasing due to lug side portions 55 on the side of the slot 32 away from the plate 15. The parts are thus in a maintained assembly responsive to rough handling without defeat of ready operation as occasion may arise.

In the operation hereunder, the base 1 with the stem 4 upright therewith may have the box 8 located thereon in position to engage the under side say of a bumper. This position may be attained when the "down" portion 54 of the key is in position to hold the lever 44. At such adjusted position, the key is rotated to have the side 52 exposed to the operator of the lever 44. In this position, the operator may oscillate the lever 44 and the box 8 will climb up the stem 4 due to the plate 36, at up swing of the lever 44, being free to ride up on the shaft 4, but at the reverse or down position of the lever 44 the plate 36 forthwith grips the stem 4 and moves the box and with it the upper plate 15 for ascent. At the reverse operation of the lever 44 the plate 15 is in gripping position to hold the box 8 as thus lifted on the stem 4 and free the plate 36 for descent to re-gripping on the stem 4 and a repetition of this cycle of operations.

What is claimed and it is desired to secure by United States Letters Patent is:

1. An adjustable strut comprising a stem having a base, a complementary support directed by said stem, and control means mounted in and movable relatively to the support including a pinch plate for the stem, and an operating lever directly pivoted to the support and plate.

2. An adjustable jack comprising a stem having a base, a complementary support directed by said stem, and control means mounted in and movable relatively to the support including a pinch plate for the stem, a reciprocable lever directly pivoted to the support and plate, and spring means normally urging the pinch plate crosswise as to the stem, said lever being operable for rocking the plate to oppose said spring means.

3. An adjustable jack comprising a stem having a base, a complementary support directed by said stem, control means mounted in and movable relatively to the support including a pinch plate for the stem, a reciprocable lever directly pivoted to the support and plate, spring means normally urging the pinch plate crosswise as to the stem, and a catch connected to the support for rendering the pinch plate ineffective.

4. An adjustable jack comprising a stem having a base, a complementary support directed by said stem, control means mounted in and movable relatively to the support including a pinch plate for the stem, a reciprocable lever directly pivoted to the support and plate, spring means normally urging the pinch plate crosswise as to the stem, and a yieldably held hook adjustable as to the support to engage the lever to bring about pinch freeing position.

5. An adjustable jack comprising a stem having a base, a complementary support directed by said stem, control means mounted in and movable relatively to the support including a pinch plate for the stem, a reciprocable lever directly pivoted to the support and plate and oscillable for shifting the pinch plate as to the support, and a holding plate for the support as released by the pinch plate.

6. An adjustable jack comprising a stem having a base, a complementary support directed by said stem, control means mounted in and movable relatively to the support including a pinch plate for the stem, a reciprocable lever directly pivoted to the support and plate and oscillable for shifting the pinch plate as to the support, a holding plate for the support as released by the pinch plate, and a spring for locating the holding plate normally in one way operable position as to the support.

7. An adjustable jack comprising a stem having a base, a complementary support directed by said stem, control means mounted in and movable relatively to the support including a pinch plate for the stem, a reciprocable lever directly pivoted to the support and plate and oscillable for shifting the pinch plate as to the support, a holding plate for the support as released by the pinch plate, a spring for locating the holding plate normally in one way operable position as to the support, and a cut-out for the pinch plate simultaneously freeing the holding plate for thereby releasing the stem from the support.

8. An adjustable jack comprising a support, a stem providing a guide for the support, and a relatively movable shiftable plate for engaging the stem, mounted by the support and having an offset portion providing a load receiving seat.

9. In an elevating device, a standard, a pair of clutch members mounted on said standard and normally frictionally engaging said standard, one of said clutch members adapted to engage or support the body to be elevated, a lever directly pivoted on the other of said clutch members, relatively movable means directly connecting said lever and said first named clutch member, and a manual control device mounted in the means and movable relatively thereto for rendering the lever effective to release the latter clutch member to allow their free movement on said standard.

10. An elevating device comprising a standard, a pair of canting members mounted on said standard, a pair of springs mounted on said canting members for normally frictionally engaging said canting members on said standard, one of said canting members adapted directly to engage a body to be elevated, a lever directly pivoted to the other of said canting members, relatively movable means directly connecting said lever to the first named canting member, and a control device mounted in the means and movable relatively thereto for rendering the lever effective to release the latter canting member on said standard to allow their free movement in either direction.

HUBERT A. MYERS.